(12) United States Patent
Dingeldein et al.

(10) Patent No.: US 11,248,388 B2
(45) Date of Patent: Feb. 15, 2022

(54) COMMERCIAL HOPPER GRAIN BIN ASSEMBLY METHOD

(71) Applicant: CTB, Inc., Milford, IN (US)

(72) Inventors: Mark S. Dingeldein, Milford, IN (US); Craig P. Smallegan, Leesburg, IN (US); David A. Butler, Elkhart, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 16/866,069

(22) Filed: May 4, 2020

(65) Prior Publication Data

US 2020/0370322 A1 Nov. 26, 2020

Related U.S. Application Data

(60) Provisional application No. 62/850,082, filed on May 20, 2019.

(51) Int. Cl.
| | |
|---|---|
| *E04H 7/22* | (2006.01) |
| *E04B 1/35* | (2006.01) |
| *B65G 3/04* | (2006.01) |

(52) U.S. Cl.
CPC ............. *E04H 7/22* (2013.01); *E04B 1/3522* (2013.01); *B65G 3/04* (2013.01)

(58) Field of Classification Search
CPC . B65G 3/04; E04B 1/3522; E04B 2001/0061; E04H 7/22; E04H 7/30

(Continued)

(56) References Cited

U.S. PATENT DOCUMENTS

| | | | | |
|---|---|---|---|---|
| 1,706,514 A | * | 3/1929 | Baker | B65D 88/26 52/197 |
| 2,984,898 A | * | 5/1961 | Svensson | E04H 7/06 29/429 |

(Continued)

FOREIGN PATENT DOCUMENTS

| | | |
|---|---|---|
| DE | 1292366 B | 4/1969 |
| DE | 1684587 A1 | 3/1971 |

OTHER PUBLICATIONS

Brock® Commercial Tower Dryer, Base Installation Manual, MFH1933A, Aug. 2009.

(Continued)

*Primary Examiner* — Brian D Mattei
*Assistant Examiner* — Joseph J. Sadlon
(74) *Attorney, Agent, or Firm* — Harness, Dickey & Pierce, P.L.C.

(57) ABSTRACT

A commercial hopper grain bin shell can be assembled on a concrete pad using jacks to successively support previously coupled side-wall panel rings above the concrete pad. The assembled shell can be supported above the concrete pad with the jacks while coupling a horizontal support beam around a bottom of the assembled commercial hopper grain bin shell. An uppermost ring of vertical support legs can be coupled to the horizontal support beam. An uppermost ring of hopper panels can be coupled to the horizontal support beam. The assembled shell and the vertical support legs previously coupled to the horizontal support beam can be successively supported above the concrete pad with jacks while coupling an additional ring of vertical support legs to the bottom of the previously coupled vertical support legs. An additional ring of hopper panels can be successively coupled to the bottom of the previously coupled hopper panels.

31 Claims, 16 Drawing Sheets

(58) Field of Classification Search
USPC ...................................................... 52/745.01
See application file for complete search history.

(56) References Cited

U.S. PATENT DOCUMENTS

| | | | | |
|---|---|---|---|---|
| 3,131,908 | A * | 5/1964 | Payton | E04H 7/30 |
| | | | | 254/89 H |
| 3,182,958 | A * | 5/1965 | Peterzon-Arbella | E04H 7/06 |
| | | | | 254/89 H |
| 3,828,513 | A * | 8/1974 | Vanderklaauw | E04B 1/3511 |
| | | | | 52/745.04 |
| 5,577,362 | A * | 11/1996 | Yamashita | E04B 1/24 |
| | | | | 52/745.03 |
| 6,247,277 | B1 * | 6/2001 | Kerpash, Sr. | A62B 1/22 |
| | | | | 52/192 |
| 6,299,137 | B1 * | 10/2001 | Bainter | B66F 3/28 |
| | | | | 254/89 H |
| 6,499,266 | B1 | 12/2002 | Macumber | |
| 9,097,033 | B2 * | 8/2015 | Margevicius | E04H 12/344 |
| 9,133,640 | B2 * | 9/2015 | Cantoni | E04H 7/04 |
| 9,187,921 | B1 * | 11/2015 | Neighbors | E04H 7/02 |
| 10,017,952 | B2 * | 7/2018 | Grossman | B65D 88/08 |
| 10,807,792 | B2 * | 10/2020 | Froese | B65D 88/28 |
| 2012/0193357 | A1 * | 8/2012 | Pleima | A01F 25/2018 |
| | | | | 220/200 |
| 2019/0021232 | A1 | 1/2019 | Comte | |

OTHER PUBLICATIONS

Brock® EH-Series, Commercial Hopper Bins, Sub-Structure, Hopper and Foundation, MCB1606G, Dec. 2017.
Brock® Everest® EH-Series, Commercial Hopper Bins, Sidewall Construction Manual, MCB2084A, Nov. 2018.
International Search Report and Written Opinion in International Application No. PCT/US2020/033103 dated Nov. 2, 2020.

* cited by examiner

COMMERCIAL HOPPER GRAIN BIN ASSEMBLY METHOD

CROSS-REFERENCE TO RELATED APPLICATIONS

This application claims the benefit of U.S. Provisional Application No. 62/850,082, filed on May 20, 2019. The above application is incorporated herein by reference in its entirety.

FIELD

The present disclosure relates to commercial hopper grain bin assembly methods.

BACKGROUND

This section provides background information related to the present disclosure which is not necessarily prior art.

Historically, a commercial hopper grain bin support structure is assembled on a concrete pad. With reference to FIGS. 1 and 2, the support structure includes vertical legs that are coupled together using cross-braces and horizontal tie braces. Typically, each vertical leg is a one piece member. In any event, each vertical leg is raised upright as a unit having its final length. Such final length vertical legs are heavy and must be raised and supported in their upright positions while being coupled to each other by the braces. Due to the substantial size and weight of these final length vertical legs and the height to which they are raised and at which they are coupled together, a crane or other lifting machine that can span the required height and also scaffolding are typically required for the assembly of the support structure including these vertical legs of commercial hopper grain bins.

With reference to FIGS. 3 through 5, the hopper is next assembled to the completed support structure. Specifically, a first ring of hopper panels is coupled to the horizontal support beam that runs around the top of the support structure. Because it is at the top of the support structure, this horizontal support beam is relatively high above the ground (e.g., 15 or 20 feet or more), and each of the first ring hopper panels are typically somewhat heavy (e.g., 150 pounds or more), a crane or other lifting machine that can span the required height and also scaffolding are typically required for the assembly of the hopper of commercial hopper grain bins.

Separately, the commercial hopper grain bin shell or tank is assembled on another or oversized concrete pad using traditional grain bin jacking assembly techniques. With reference to FIG. 6, a crane must then lift the completed grain bin shell and place it upon the completed support and hopper assembly. This commercial hopper construction technique is currently used across the industry. However, mobile cranes of sufficient capacity to lift such commercial bin shells or tanks and that can navigate typical roadways to the construction or assembly site are very expensive and require room to set up. Safely lifting and swinging the bin shell or tank into place in the often restricted areas of a grain facility layout can in sometimes be quite difficult.

The current system is difficult with the size of a 36 foot diameter hopper tank and very difficult for the few 42 foot diameter tanks that have been built, and will likely be an insurmountable challenge for a future 48 foot diameter or larger tank. In addition, when lifting the hopper tank with a crane and cable anchor system, the stresses involved can cause distortion and damage to the side walls of the bin or tank. This can require the bin or tank structure to be over-designed in order to handle the lifting stresses; particularly for larger diameter tanks.

SUMMARY

This section provides a general summary of the disclosure, and is not a comprehensive disclosure of its full scope or all of its features.

In accordance with one aspect of the present disclosure a commercial hopper grain bin assembly method can include assembling a commercial hopper grain bin shell on a concrete pad by successively supporting a plurality of corrugated side-wall panel rings that have been previously coupled together above the concrete pad with jacks while coupling a subsequent corrugated side-wall panel ring to a bottom of the plurality of previously coupled side-wall panel rings. The assembled commercial hopper grain bin shell can be supported above the concrete pad with the jacks while coupling a horizontal support beam around a bottom of the assembled commercial hopper grain bin shell. An uppermost ring of vertical support legs can be coupled to the horizontal support beam. An uppermost ring of hopper panels can be coupled to the horizontal support beam. The assembled commercial hopper grain bin shell and the vertical support legs previously coupled to the horizontal support beam can be successively supported above the concrete pad with jacks while coupling an additional ring of vertical support legs to the bottom of the previously coupled vertical support legs. An additional ring of hopper panels can be successively coupled to the bottom of the previously coupled hopper panels.

In other aspects, each of: the coupling the horizontal support beam around the bottom of the assembled commercial hopper grain bin shell, the coupling the uppermost ring of hopper panels to the horizontal support beam, the successively coupling the additional ring of vertical support legs to the bottom of the previously coupled vertical support legs, and the successively coupling the additional ring of hopper panels to the bottom of the previously coupled hopper panels, can be accomplished at a height above the concrete pad which can be reached without the need for scaffolding. The coupling the uppermost ring of vertical support legs to the horizontal support beam can additionally be accomplished at a height above the concrete pad which can be reached without the need for scaffolding. The coupling the horizontal support beam around the bottom of the assembled commercial hopper grain bin shell can be accomplished while the horizontal support beam is positioned at a height of less than 4 feet above the concrete pad.

In other aspects, the assembled commercial hopper grain bin shell and the hopper panels previously coupled to the horizontal support beam can be successively supported above the concrete pad with jacks while successively coupling the additional ring of hopper panels to the bottom of the previously coupled hopper panels. The assembled commercial hopper grain bin shell and the previously coupled horizontal support beam can be supported above the concrete pad with the jacks while coupling the uppermost ring of hopper panels to the horizontal support beam. The assembled commercial hopper grain bin shell and the previously coupled horizontal support beam can be supported above the concrete pad with the jacks while coupling the uppermost ring of vertical support legs to the horizontal support beam. The jacks can be coupled to vertical stiffeners of the commercial hopper grain bin shell while coupling the uppermost ring of hopper panels to the horizontal support beam ring. The jacks can be coupled to vertical stiffeners of the commercial hopper grain bin shell while coupling the uppermost ring of vertical support legs to the horizontal support beam ring.

In other aspects, the jacks can be positioned exteriorly while successively coupling the additional ring of hopper panels to the bottom of the previously coupled hopper panels. The jacks can be positioned interiorly while successively coupling the subsequent corrugated side-wall panel ring to the bottom of the plurality of previously coupled side-wall panel rings. The jacks can be coupled to at least one horizontal seam between the plurality of the previously coupled side-wall panel rings while successively coupling the subsequent corrugated side-wall panel ring to the bottom of the plurality of previously coupled side-wall panel rings. The jacks can be coupled to the previously coupled vertical support legs while successively coupling the additional rings of vertical support legs to the bottom of the previously coupled vertical support legs. The jacks can be positioned exteriorly while successively coupling the coupling the additional rings of vertical support legs to the bottom of the previously coupled vertical support legs.

In other aspects, the assembly method can include coupling cross-bracing between adjacent vertical support legs of each ring of vertical support legs. The hopper panels can be moved to a bin interior through space between at least one pair of adjacent vertical support legs of the uppermost ring of vertical support legs prior to coupling the cross-bracing between the at least one pair of adjacent vertical support legs.

In other aspects, the successively coupling the additional rings of vertical support legs to the bottom of the previously coupled vertical support legs can include coupling a first ring of vertical support legs in which the vertical support legs have a first configuration, and coupling a second ring of vertical support legs in which the vertical support legs have a second configuration that is different from the first configuration. The different configuration can include the vertical support legs with the first configuration having a different length than the vertical support legs with the second configuration.

In other aspects, the coupling the horizontal support beam around the bottom of the assembled commercial hopper grain bin shell can include coupling a set of stub legs integrated with the horizontal support beam around the bottom of the assembled commercial hopper grain bin shell. The bottom of the previously coupled vertical support legs and the bottom of the previously coupled hopper panels can be coordinated to simultaneously position both at a height above the concrete pad which can be reached without the need for scaffolding to enable both the coupling the additional ring of vertical support legs and the coupling the additional ring of hopper panels without the need to adjust a bin height above the concrete pad.

In other aspects, vertical support legs having a first configuration can be used to assemble both a first commercial hopper grain bin having a first diameter and a second commercial hopper grain bin having a second diameter. The assembling a commercial hopper grain bin shell can include assembling a commercial hopper grain bin shell having diameters including 42 feet or greater, and 48 feet or greater.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
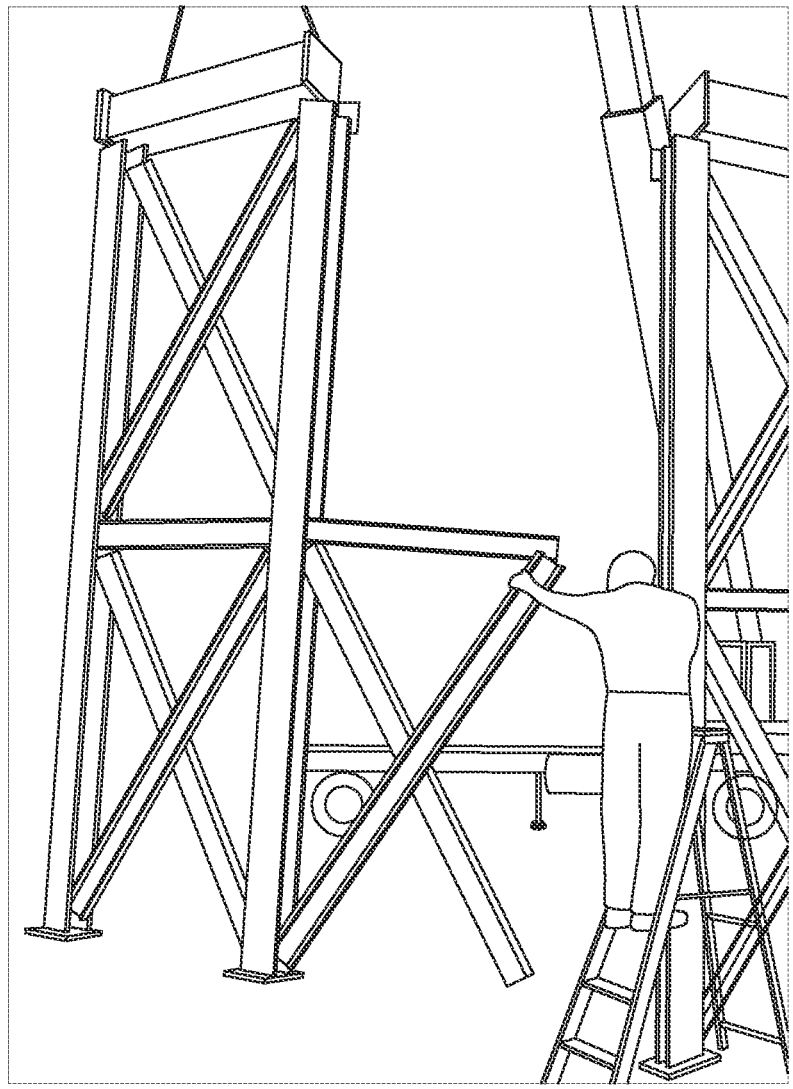
FIG. 1 is a perspective view showing assembly of the vertical support leg structure on the concrete pad in a prior art commercial hopper grain bin assembly method.
Figure 2:
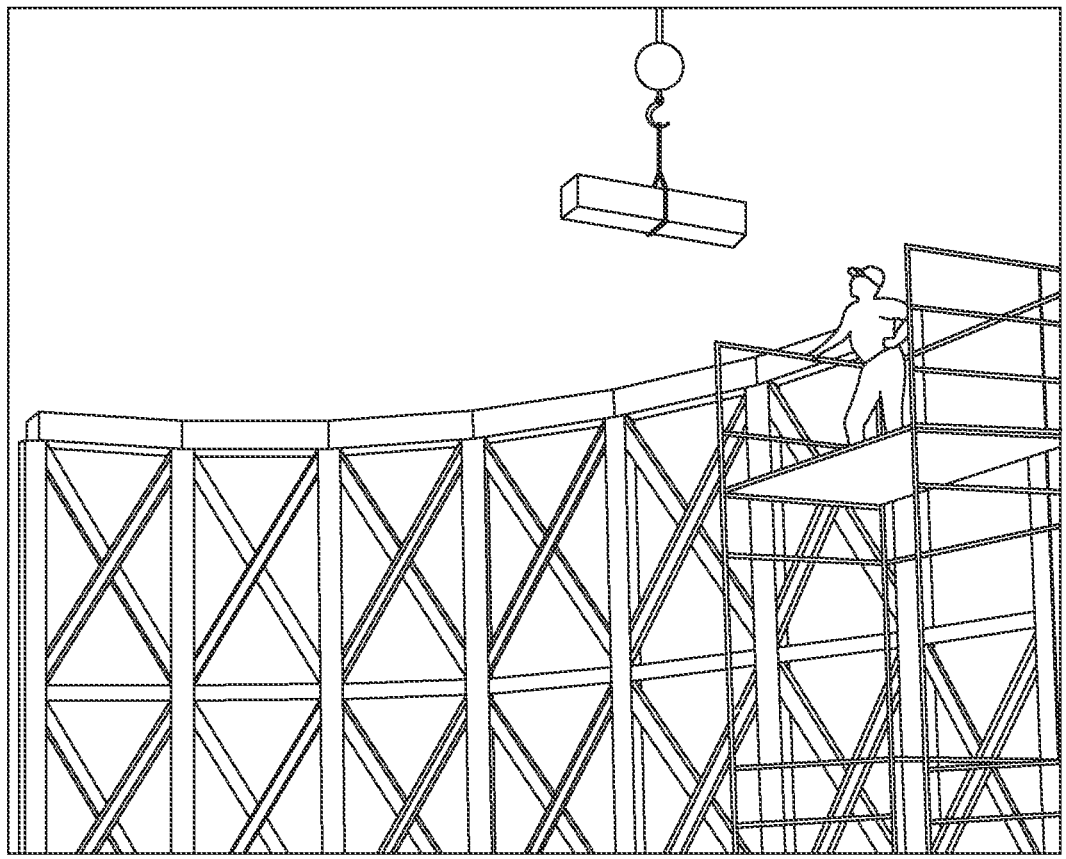
FIG. 2 is a perspective view showing assembly of the horizontal support beam to the support leg structure high above the concrete pad in a prior art commercial hopper grain bin assembly method.
Figure 3:
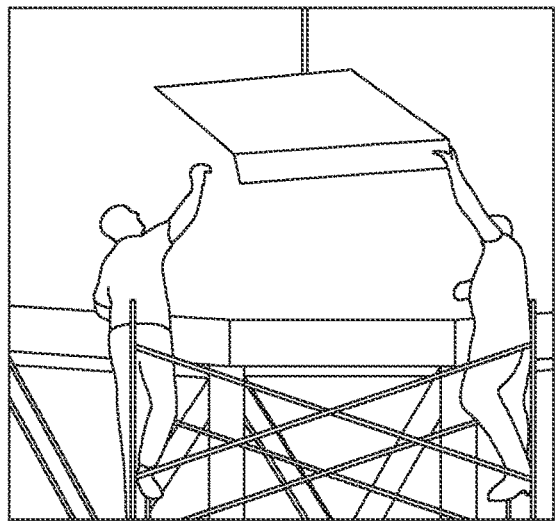
FIGS. 3 and 4 are perspective views showing assembly of the uppermost ring of hopper panels to the horizontal support beam high above the concrete pad in a prior art commercial hopper grain bin assembly method.
Figure 4:
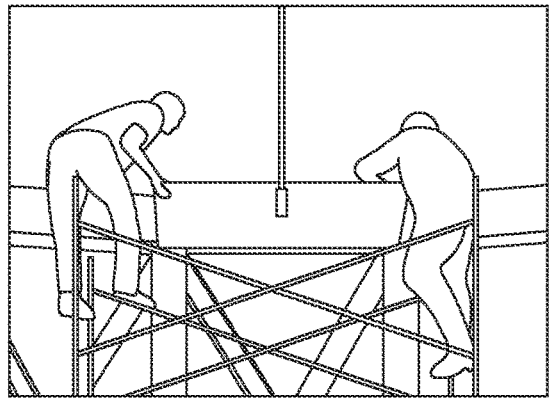
Figure 5:
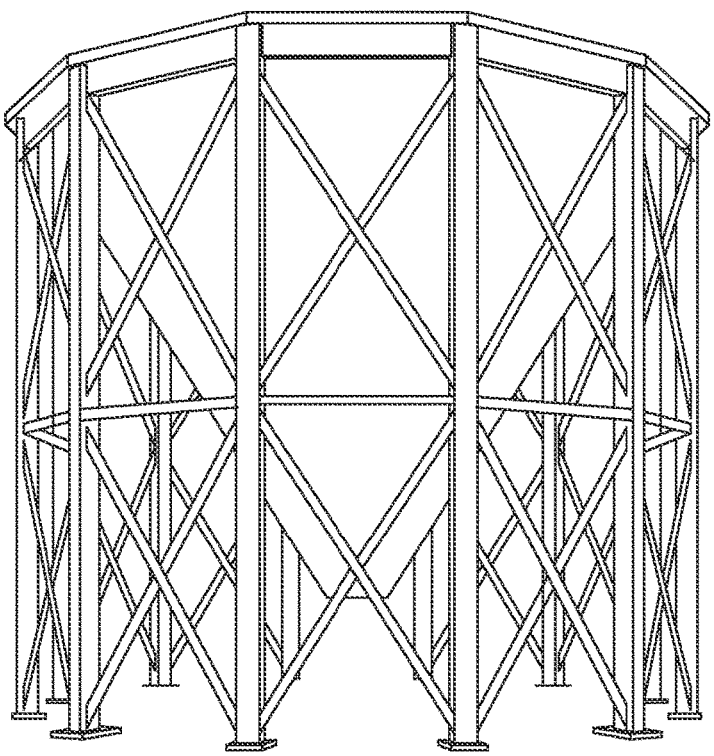
FIG. 5 is a perspective view of a completed sub-assembly, including the hopper, the support leg structure and the horizontal support beam on the concrete pad in a prior art commercial hopper grain bin assembly method.
Figure 6:
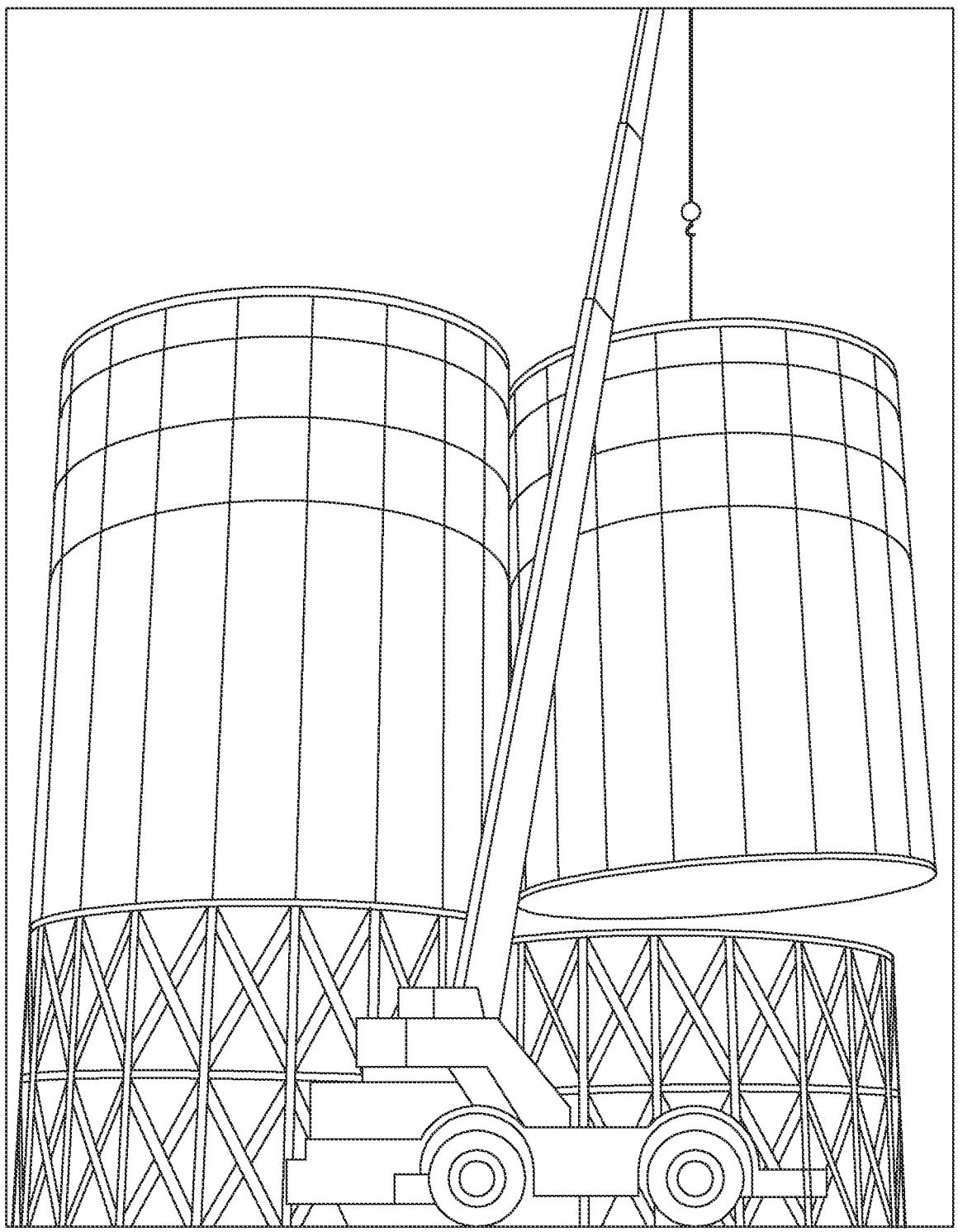
FIG. 6 is a perspective view showing lifting and moving of the completed commercial grain bin shell sub-assembly, which has been completed away from the concrete pad, to a completed sub-assembly similar to FIG. 5 on the concrete pad for assembly therewith.
Figure 7:
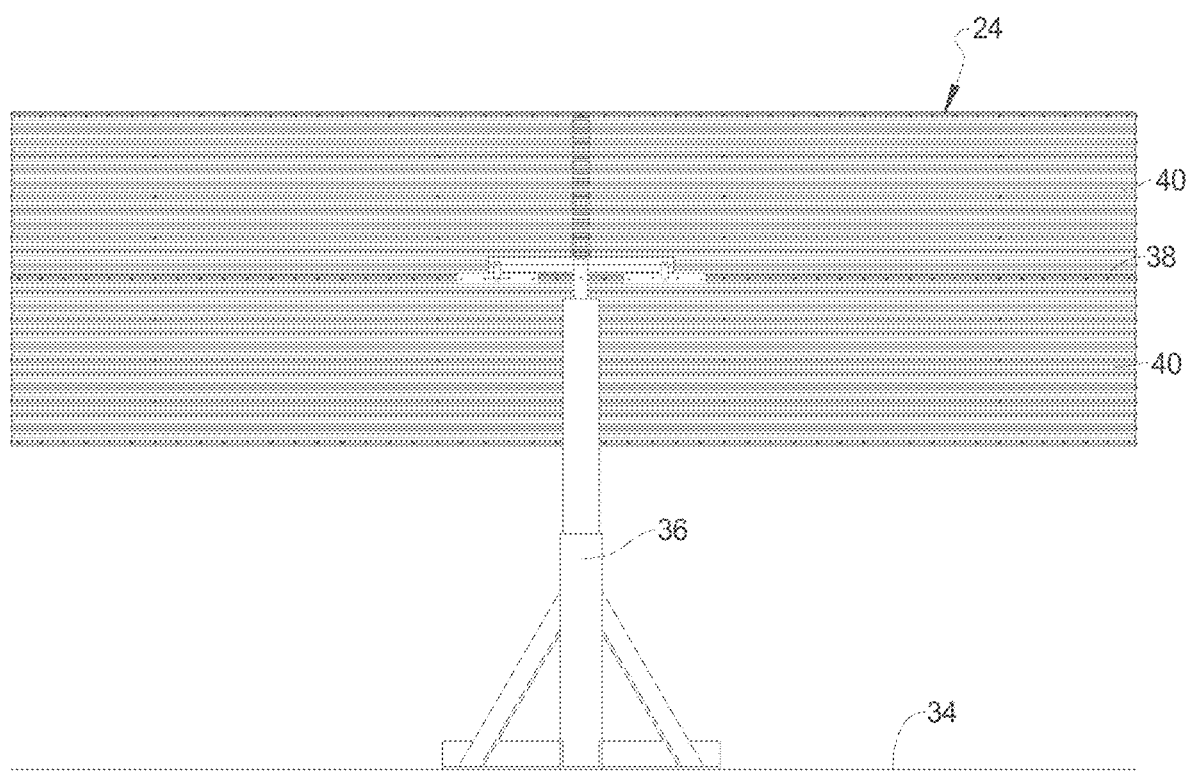
FIG. 7 is a side elevation view showing one example of supporting a plurality of previously coupled corrugated side-wall panel rings above the concrete pad with jacks in accordance with various exemplary commercial hopper grain bin assembly methods of the present disclosure.
Figure 8:
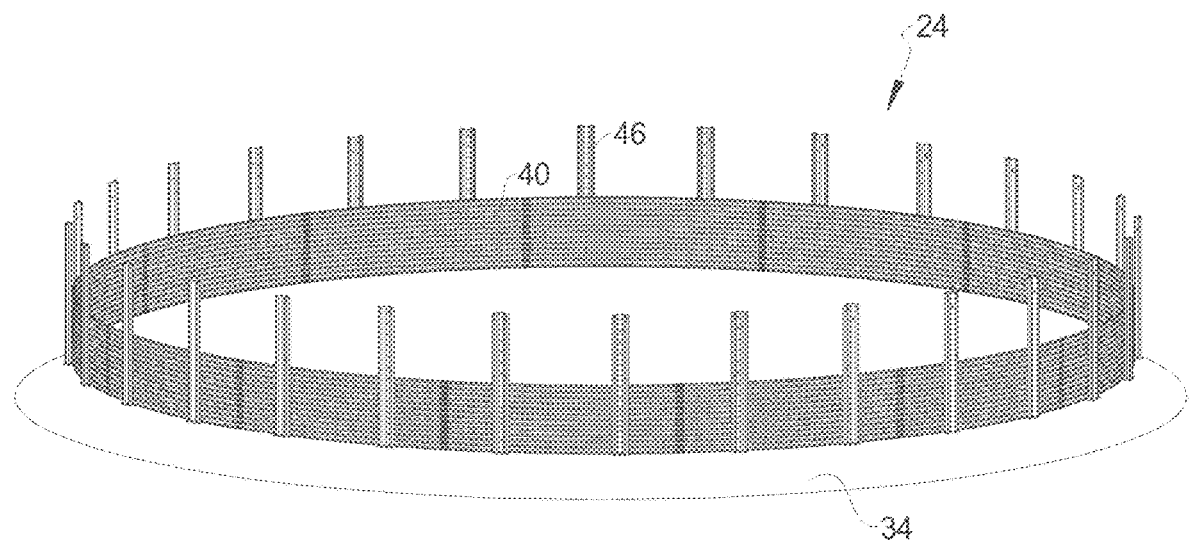
FIG. 8 is a perspective view showing the last corrugated side-wall panel ring (for simplicity) of one example of a completed commercial hopper grain bin hopper shell which can be supported above the concrete pad with jacks in accordance with various exemplary commercial hopper grain bin assembly methods of the present disclosure.
Figure 9:
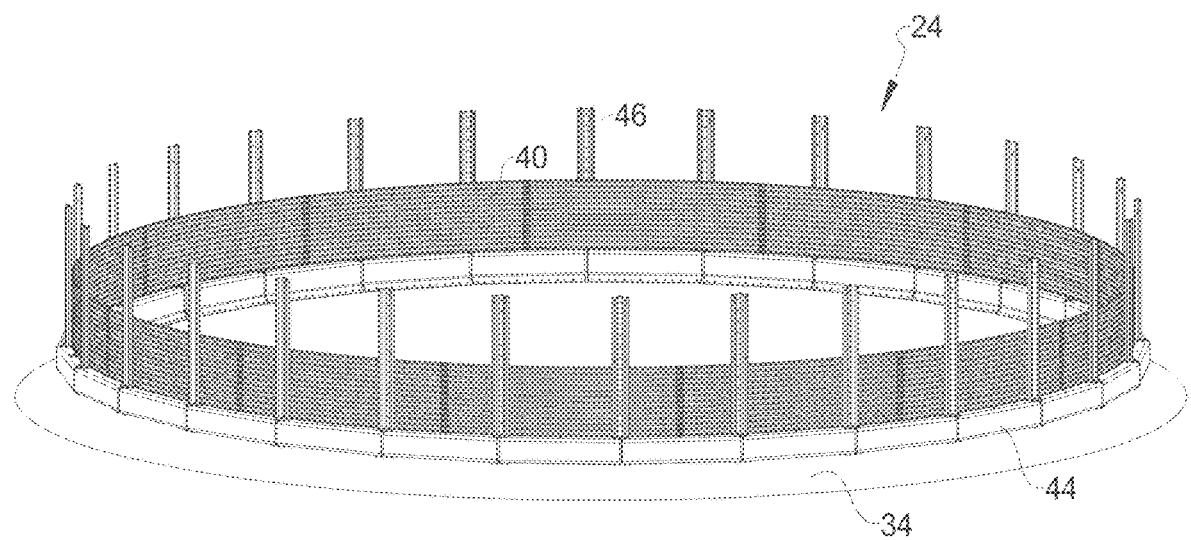
FIG. 9 is a perspective view showing the horizontal support beam coupled to the bottom of the completed commercial grain bin hopper shell of FIG. 8 which can together be supported above the concrete pad with jacks in accordance with various exemplary commercial hopper grain bin assembly methods of the present disclosure.
Figure 10:
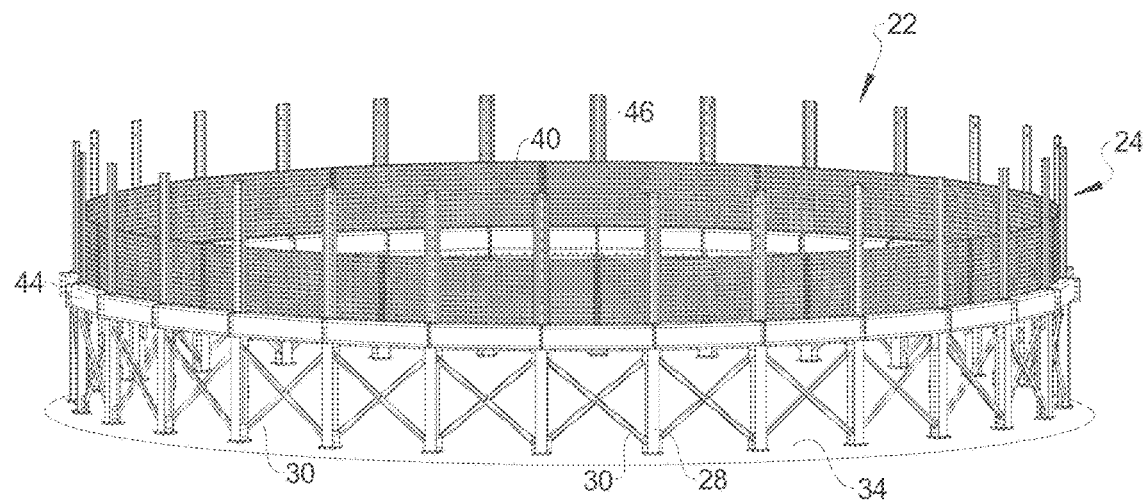
FIG. 10 is a perspective view showing the uppermost ring of vertical support legs coupled to the assembly of FIG. 9, which can together be supported above the concrete pad with jacks in accordance with various exemplary commercial hopper grain bin assembly methods of the present disclosure.
Figure 11:
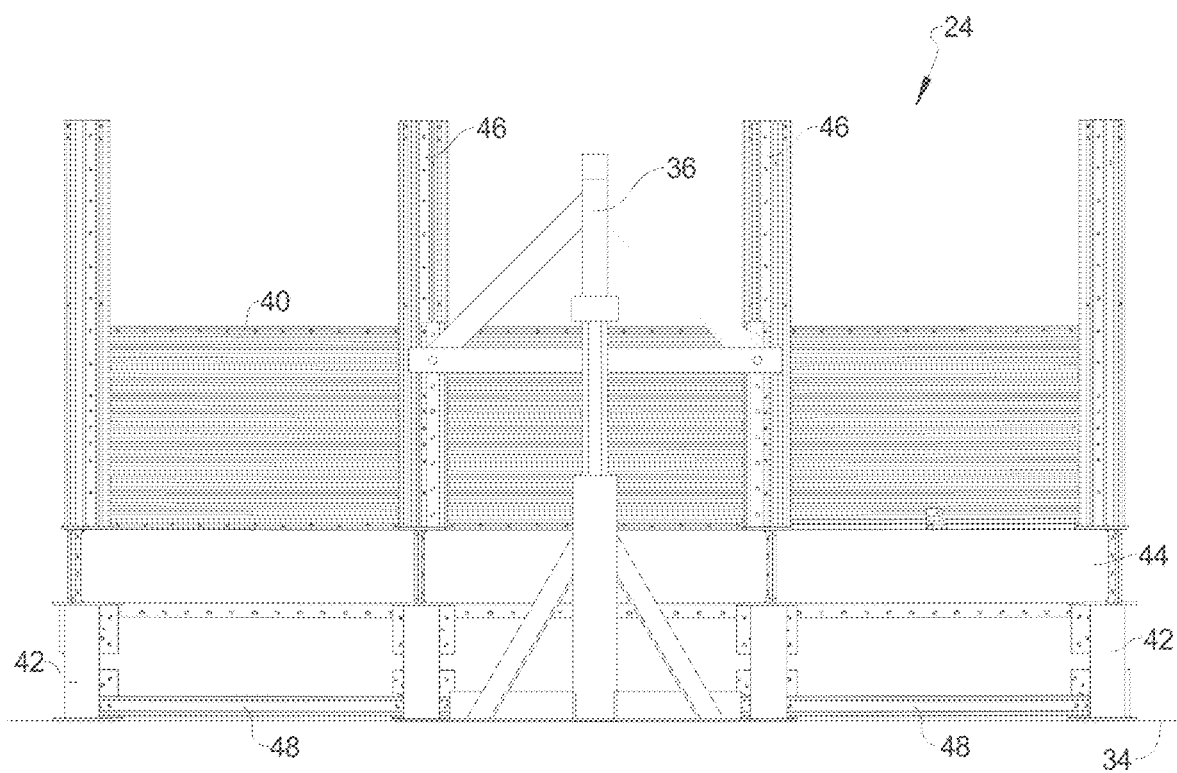
FIG. 11 is a side elevation view showing a jack coupled to the vertical stiffeners of the commercial hopper grain bin shell for supporting the assembly of FIG. 9 above the concrete pad with jacks in accordance with various exemplary commercial hopper grain bin assembly methods of the present disclosure.
Figure 12:
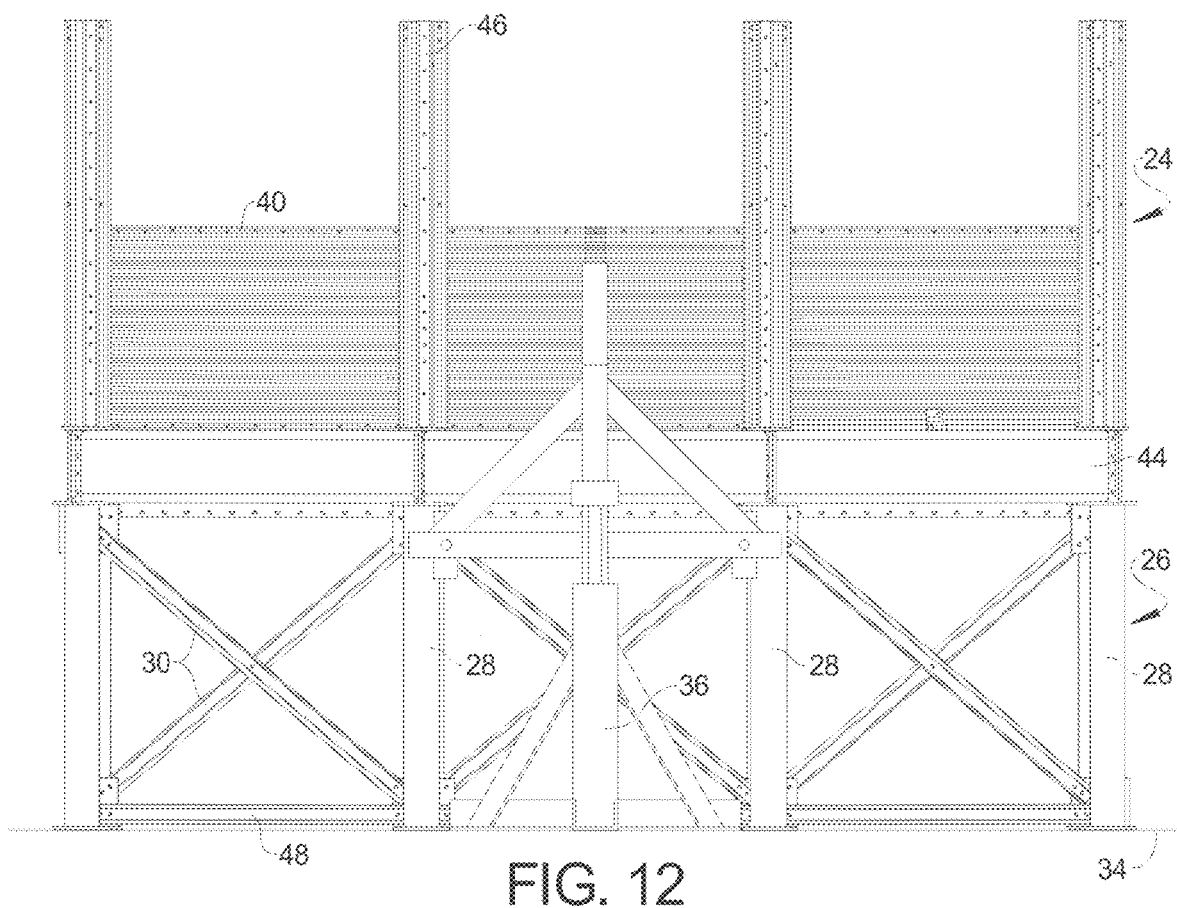
FIG. 12 is a side elevation view showing a jack coupled to the vertical support legs of the assembly of FIG. 10 for supporting the assembly of FIG. 10 or FIG. 13 above the concrete pad with jacks in accordance with various exemplary commercial hopper grain bin assembly methods of the present disclosure.
Figure 13:
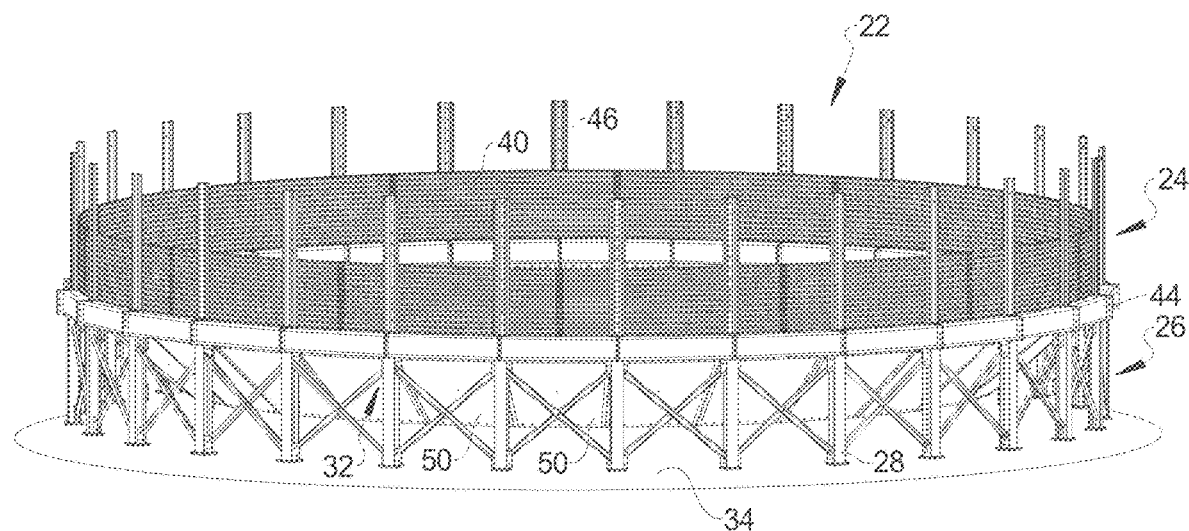
FIG. 13 is a perspective view showing the uppermost ring of hopper panels coupled to the horizontal support beam of the assembly of FIG. 10, which together can be supported above the concrete pad with jacks in accordance with various exemplary commercial hopper grain bin assembly methods of the present disclosure.
Figure 14:
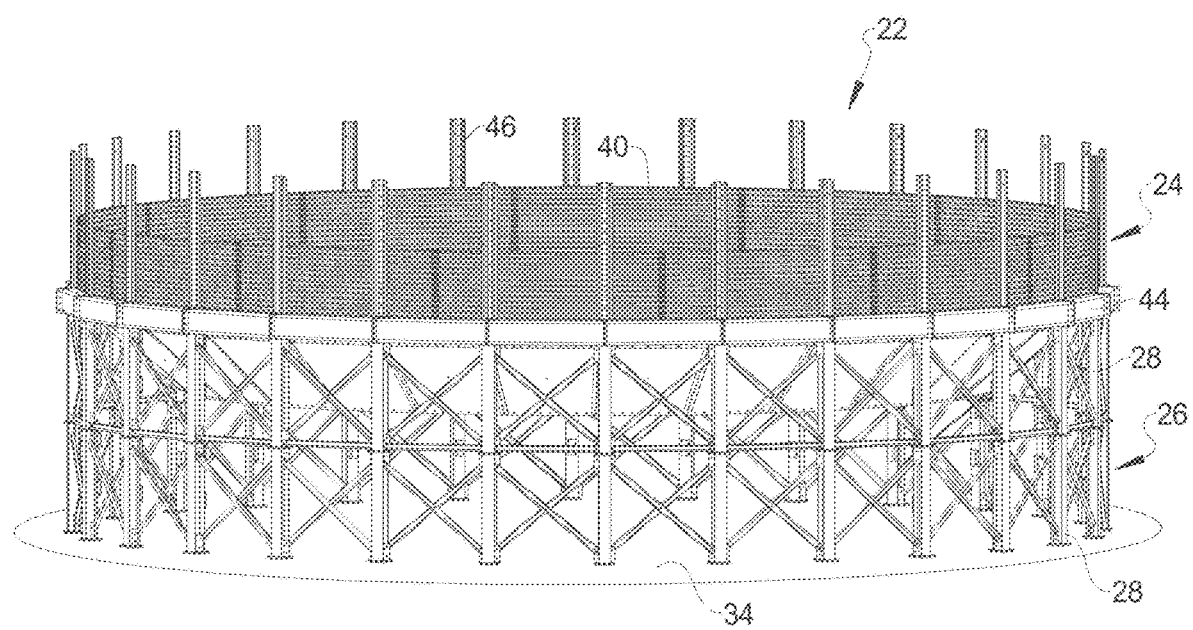
FIG. 14 is a perspective view showing an additional ring of vertical support legs coupled to the assembly of FIG. 13, which can together be supported above the concrete pad with jacks in accordance with various exemplary commercial hopper grain bin assembly methods of the present disclosure.
Figure 15:
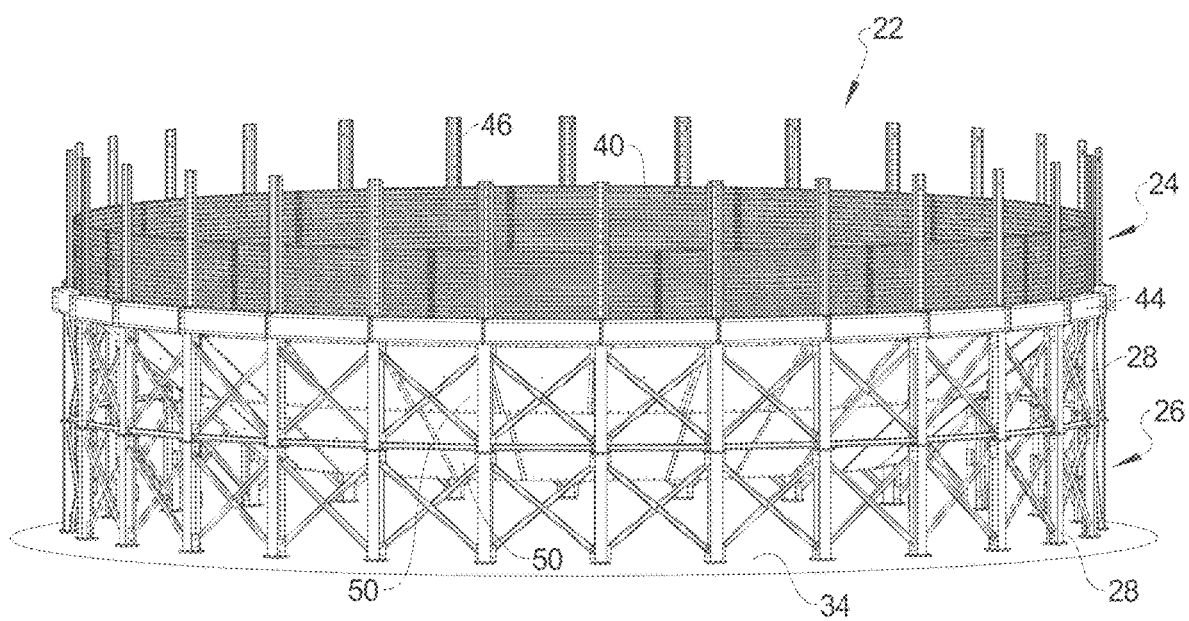
FIG. 15 is a perspective view showing an additional ring of hopper panels coupled to the assembly of FIG. 14, which can together be supported above the concrete pad with jacks in accordance with various exemplary commercial hopper grain bin assembly methods of the present disclosure.
Figure 16:
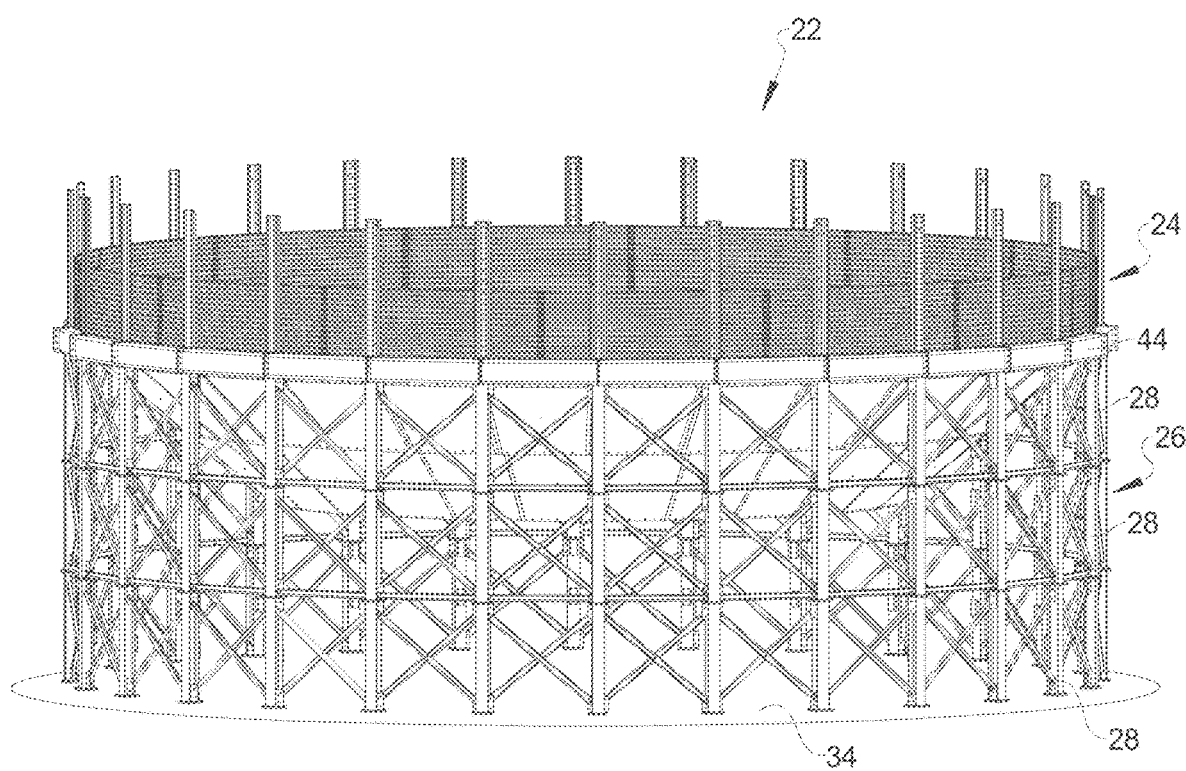
FIG. 16 is a perspective view showing a successive additional ring of vertical support legs coupled to the assembly of FIG. 15, which can together be supported above the concrete pad with jacks in accordance with various exemplary commercial hopper grain bin assembly methods of the present disclosure.
Figure 17:
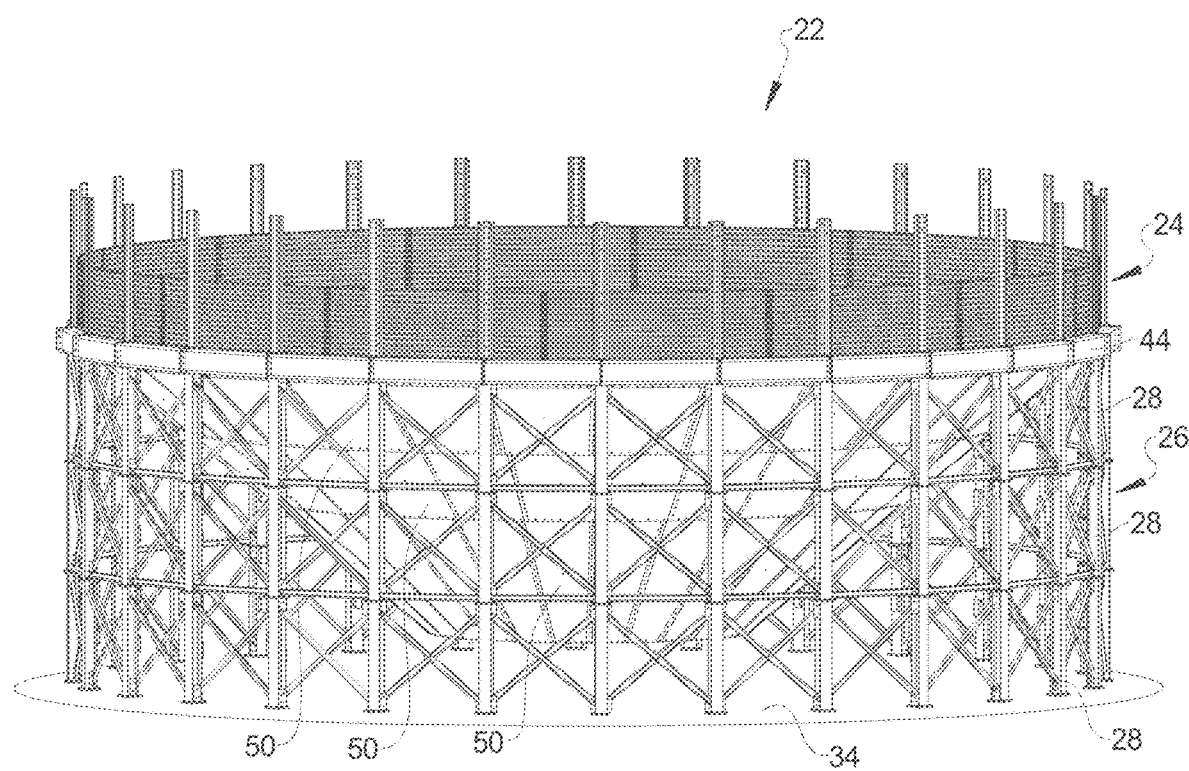
FIG. 17 is a perspective view showing an additional ring of hopper panels coupled to the assembly of FIG. 16, which can together be supported above the concrete pad with jacks in accordance with various exemplary commercial hopper grain bin assembly methods of the present disclosure.
Figure 18:
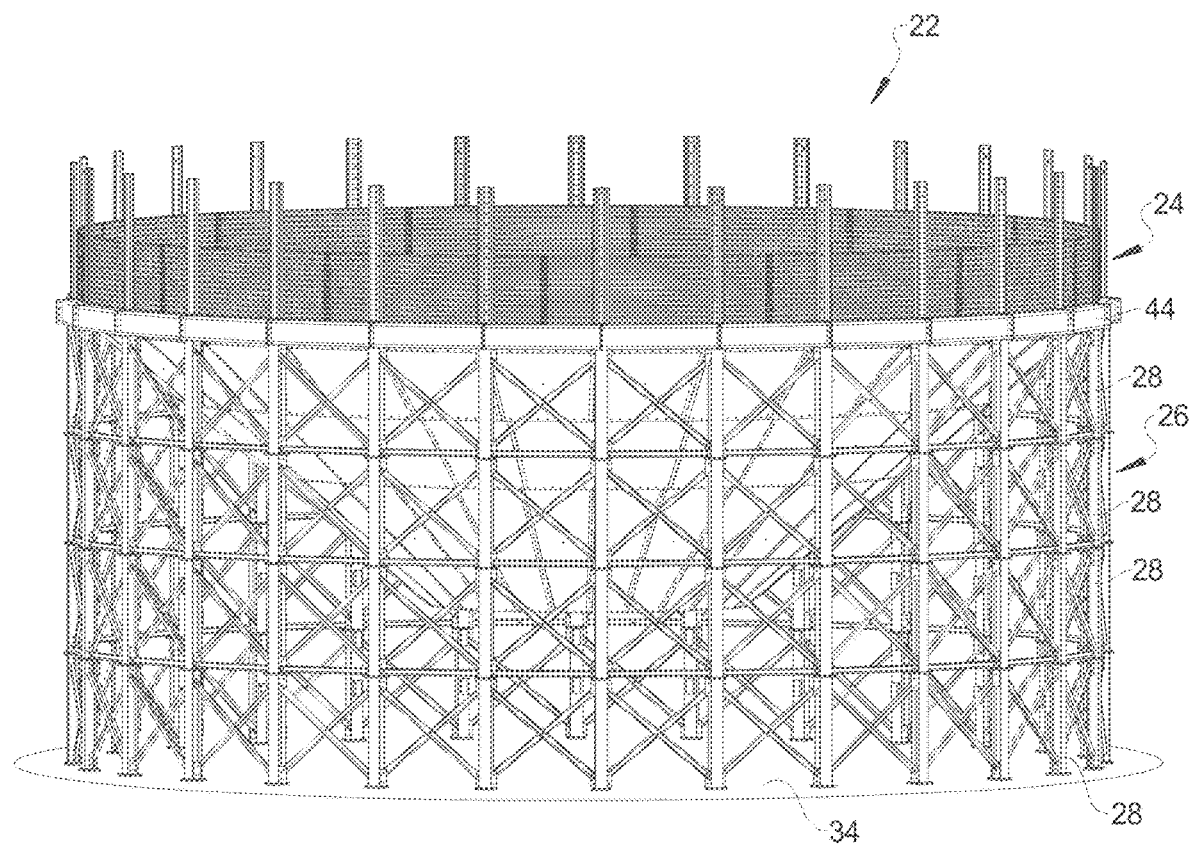
FIG. 18 is a perspective view showing a successive additional ring of vertical support legs coupled to the assembly of FIG. 17, which can together be supported above the concrete pad with jacks in accordance with various exemplary commercial hopper grain bin assembly methods of the present disclosure.
Figure 19:
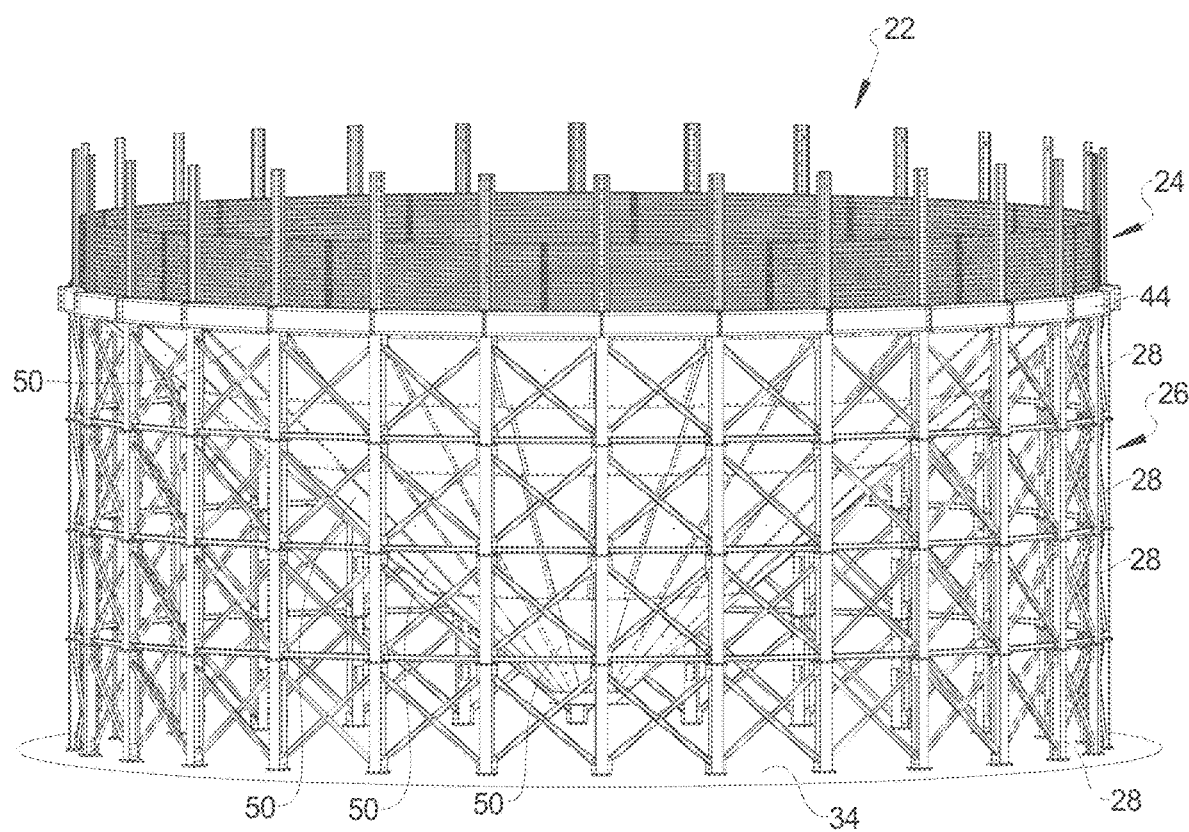
FIG. 19 is a perspective view showing an additional ring of hopper panels coupled to the assembly of FIG. 18, which can together be supported above the concrete pad with jacks in accordance with various exemplary commercial hopper grain bin assembly methods of the present disclosure.
Figure 20:
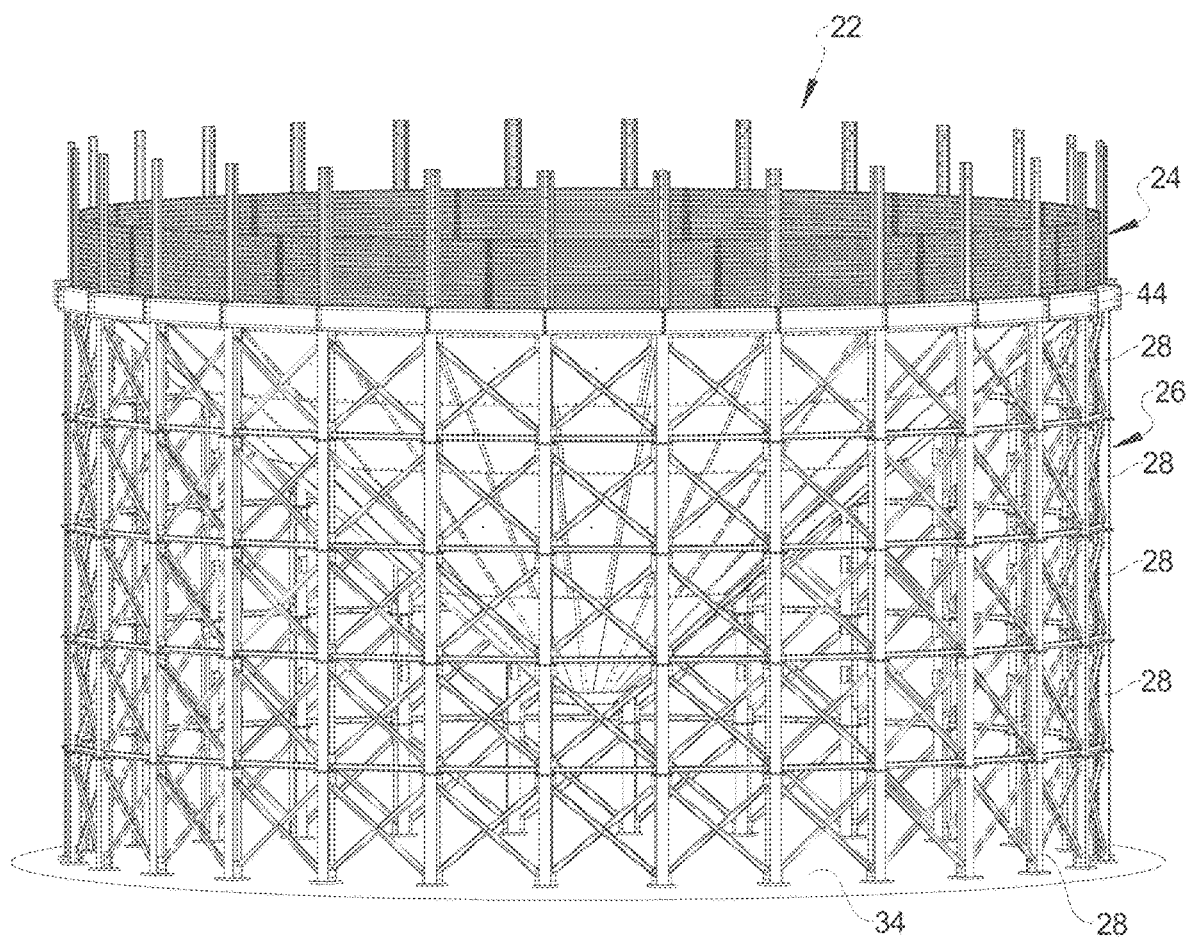

FIG. 20 is a perspective view of a completed commercial hopper grain bin (as throughout, showing only the last corrugated side-wall panel ring for simplicity), including a successive additional ring of vertical support legs coupled to the assembly of FIG. 19, which has been assembled in-place on the concrete pad in accordance with various exemplary commercial hopper grain bin assembly methods of the present disclosure.

Figure 21:
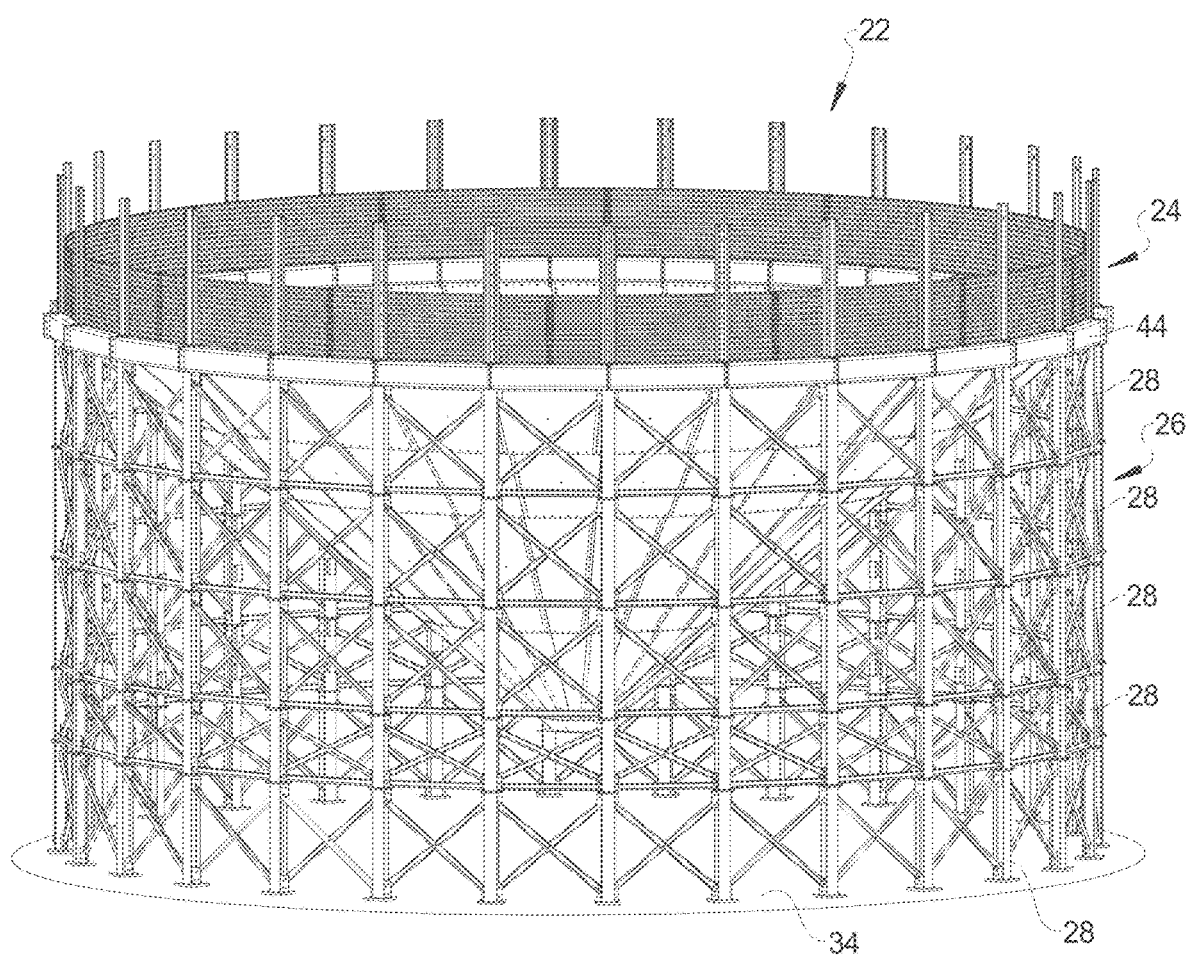

FIG. 21 is a perspective view of another example of a completed commercial hopper grain bin, but with the configuration of one of the vertical support leg rings being different from the configuration of another support leg rings, which has been assembled in-place on the concrete pad in accordance with various exemplary commercial hopper grain bin assembly methods of the present disclosure.

Corresponding reference numerals indicate corresponding parts throughout the several views of the drawings.

DETAILED DESCRIPTION

Example embodiments will now be described more fully with reference to the accompanying drawings.

Although the methods described herein can be used with smaller commercial hopper bins, these methods are particularly beneficial when assembling commercial hopper bins 22 having a diameter that is at least 42 feet, 48 feet, 54 feet, 60 feet, or more. For example, increasing the diameter of a commercial hopper bin 22 increases the weight of the hopper bin shell 24 that must be supported by the support structure 26, which means the load bearing capacity and resulting overall weight of the support structure 26 are larger. In addition, the diameter over which the support structure 26 must be provided is larger, requiring more structural support elements which further increases the overall weight of the support structure 26. Additionally, increasing the diameter increases the vertical height of the hopper 32, which means that the overall vertical height of the support structure 26 must increase for a hopper of a given hopper angle (e.g., 40, 45, 50, or 60 degrees). This required increase in vertical height further increases the overall weight of the support structure 26. All of this additional weight of the various structural components of the support structure 26 must be moved into position and assembled together.

With reference to FIGS. 7-21, the commercial hopper grain bin shell or tank 24 is first assembled in layers or rings using traditional grain bin jacking techniques. This assembly of the grain bin shell 24 can be done in its final location on a concrete pad 34. After a first layer or ring is formed, a plurality of jacks 36 is coupled around the partial bin shell 24 to intermittently raise the shell. In some embodiments, the jacks 36 can be positioned within the interior of the shell 24 and coupled to a horizontal seam 38 between the corrugated side-wall panel rings 40 during this phase. Between the construction of the various layers or rings 40, the bin shell 24 is periodically set down on stub legs 42 on the pad 34 as necessary to reposition the jacks 36 to a lower horizontal seam 38 on the bin shell 24 so that the jacks 36 can continue lifting the bin shell 24 to add additional layers of side-wall panels 40 to the bottom thereof.

After the commercial hopper grain bin shell 24 is completed, the jacks 36 can support the bin shell 24 off the ground (i.e., above the concrete pad 34) so that segments of the horizontal support beam 44 can be attached to the bottom of the completed grain bin shell 24. In some embodiments, the jacks 36 can continue to be positioned within the interior of the shell 24 and be coupled to a horizontal seam 38 between the corrugated side-wall panels 40 during this phase. In some embodiments, the height above the pad 34 to which the segments of the horizontal support beam 44 must be raised when being attached to the grain bin shell 24 is less than 1 or 2 feet. In some embodiments, this horizontal support beam 44 segment coupling height is less than 3, 4, 5, 6, or 7 feet. As examples, the segments of the horizontal support beam 44 can be placed directly on the pad 34 or on stub legs 42. In some embodiments these or other stub legs 42 can become part of the final support structure 26. In some embodiments, the segments of the horizontal support beam 44 are coupled to the bottom of the grain bin shell 24 prior to having the vertical support legs 28 (excluding any stub legs 42) of the first or uppermost layer or ring of the support structure 26 coupled thereto.

In some embodiments, the weight of each horizontal support beam 44 segment is substantial. For example, the weight of each horizontal support beam 44 segment can be 800, 900, or 1,000 pounds or more. Because of the relatively low coupling height above the pad to which each horizontal support beam segment 44 needs to be raised, a fork truck can be used to move each of the segments of the horizontal support beam 44 into place at the coupling height. Unlike cranes, such fork trucks are commonly readily and inexpensively available easy to transport to and from an assembly job site.

The jacks 36 can support the bin shell 24 off the ground above the concrete pad 34 while the support legs 28 of the uppermost layer are coupled to the horizontal support beam 44 (directly or via stub legs 42). In some embodiments, the jacks 36 can continue to be positioned within the interior of the shell 24 of bin 22 and be coupled to a horizontal seam 38 between the corrugated side-wall panels 40 during this phase.

In alternative embodiments, the jacks 36 can be moved to the outside or exterior of the hopper bin 22 prior to this coupling of the uppermost layer of support legs 28 to the segments of the horizontal support beam 44 (directly or via stub legs 42). For example, the jacks 36 can initially be coupled exteriorly to the vertical legs 28 of the support structure 26, so the jacks 36 are never coupled to the bin shell 24 or its vertical stiffeners 46 while positioned outside the bin 22. In some embodiments, cross-braces 30, tie braces 48, or both, are provided within each support leg 28 ring or layer, so each layer is an independently supported structure.

In some embodiments, the height above the pad 34 at which the support legs 28 of a first, or uppermost layer or ring of the support structure 26 are coupled to the horizontal beam 44 (directly or via stub legs 42) or to the support legs 28 of a preceding, or higher layer, is a leg coupling height at which the coupling fasteners (not shown) can be visually, or at least manually, accessed by a person standing on the pad or without needing scaffolding. In some embodiments, the same is true with respect to coupling the vertical support legs 28 of each layer or ring of vertical support legs 28 to the one above it. In some embodiments, the leg coupling height at which the vertical support legs 28 of each layer or ring are coupled to the horizontal support beam 44 or to the bottom of the vertical support legs 28 in the preceding, or higher ring of legs 28 is at a vertical support legs 28 coupling height above the pad 34 that is 8 feet, 7 feet, 6 feet, or less.

A first or uppermost layer or ring of hopper panels 50 is coupled to the horizontal support beam 44 and each subsequent layer or ring of hopper panels 50 is coupled to the bottom of the one above it. In some embodiments, the jacks 36 would be moved to the exterior of the bin 22 prior to this hopper panel 50 coupling phase. As noted above, such exteriorly positioned jacks 36 can be coupled, for example, to the vertical bin shell stiffeners 46, to the vertical support legs 28, or both, during the hopper panel 50 coupling phases. In some embodiments, hopper panels 50 can be positioned within the interior (periphery) of the hopper bin 22 prior to coupling all of the first ring of vertical support legs 28. In some embodiments, the hopper panels 50 can be positioned within the interior of the hopper bin 22 prior to coupling of the cross-braces 30 and tie braces 48 between all adjacent pairs of the first ring of vertical support legs 28.

In some embodiments, the first, or uppermost layer or ring of hopper panels 50 is coupled to the horizontal support beam 44 at a hopper panel 50 coupling height at which the coupling fasteners can be visually, or at least manually, accessed by a person standing on the concrete pad 34 or without needing scaffolding. In some embodiments, the same is true with respect to coupling the hopper panels 50 of each layer or ring of hopper panels 50 to the bottom of the one above it. In some embodiments, the hopper panels 50 of different layers or rings are coupled to the horizontal support beam 44 or the hopper panels 50 in the preceding, or higher, ring of hopper panels 50 at a hopper panel coupling height above the pad that is less than 8, 7, or 6 feet.

In some embodiments, the vertical length of the legs 28 of a ring or rings is coordinated with an effective vertical hopper panel 50 ring length or rings so that both a hopper panel 50 ring (or rings) and a vertical support leg 20 ring (or rings) can both be coupled to the grain bin 22 with the grain bin 22 raised or positioned at the same bin height. This same bin height provides hopper panel 50 and support leg 28 coupling heights at which the coupling fasteners can be visually, or at least manually, accessed by a person standing on the pad or without needing scaffolding. In some embodiments, this coupling height above the pad 34 is less than 8, 7, or 6 feet.

In some embodiments, a single modular vertical support leg 28 can be used in support structures 26 of hopper bins 22 having different characteristics, such as different diameters, different tank and support structure heights, or different hopper angles. Thus, the need to specifically design different vertical support legs 28 in relation to each combination of characteristics can be reduced. Any such reduction can provide significant manufacturing costs savings, due to the reductions in engineering resources, manufacturing equipment (e.g., jigs) and space, inventory costs, and other economy of scale benefits. For example, a five layer or ring support structure of a particular hopper bin that uses such a modular leg 28 that is also used for at least one other configuration can provide these manufacturing savings over 20%, 40%, or more of the vertical support legs 28 for that particular hopper bin 22. If two such modular legs 28 from other bin 22 configurations are used in a particular support structure 26, these manufacturing savings can be provided, for example, over 40%, 80%, or more, of the vertical support legs 28 for that particular support structure 26. These manufacturing savings are similarly doubled if the same modular leg 28 is used in the support structures 26 for three different bin 22 configurations.

In some embodiments, each support leg 28 used in the support structure assembly processes disclosed herein, includes cross brace attachments or couplings (not shown) enabling each support leg configuration (e.g., including length and cross-section or load carrying capacity) to be used in support structures 26 of hopper bins 22 of different diameters. One example of such a cross brace attachment is disclosed in U.S. Pat. No. 6,499,266 issued to Macumber on Dec. 31, 2002, which is hereby incorporated herein by reference in its entirety. Similarly, in some embodiments, the assembly process includes using support legs 28 having a single configuration in different support structures 26 of hopper bins 22 of different diameters.

In some embodiments, the assembly process includes using support legs 28 having different configurations in different levels of a single support structure 26. For example, the weight, cross-section or load carrying capacity of support legs 28 in a lower level (or levels) of a support structure 26 can be larger than the cross-section or load carrying capacity of support legs 28 in a higher level (or levels) of the same support structure 26.

As another example, the length of support legs 28 of different levels can be different so rings of support legs 28 correspond to hopper panel 50 rings as discussed above. In some embodiments, the length of the last vertical support leg 28, or the overall final length of the support legs 28 is chosen to provide a different, or selected clearance or height between the pad 34 and the bottom of the completed hopper 32.

In some embodiments, the assembly process includes using support legs 28 having a single configuration in different levels of different support structures 26 of different hopper bins 22. For example, the different hopper bins 22 can have different diameters, heights, or hopper angles.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A commercial hopper grain bin assembly method comprising:

assembling a commercial hopper grain bin shell on a concrete pad by successively supporting a plurality of corrugated side-wall panel rings that have been previously coupled together above the concrete pad with jacks while coupling a subsequent corrugated side-wall panel ring to a bottom of the plurality of previously coupled side-wall panel rings;

supporting the assembled commercial hopper grain bin shell above the concrete pad with the jacks while coupling a horizontal support beam ring around a bottom periphery of the assembled commercial hopper grain bin shell;

coupling an uppermost ring of vertical support legs to the horizontal support beam ring;

coupling an uppermost ring of hopper panels to the horizontal support beam ring;

successively supporting the assembled commercial hopper grain bin shell and the vertical support legs previously coupled to the horizontal support beam ring above the concrete pad with the jacks while coupling an additional ring of vertical support legs to the bottom of the previously coupled vertical support legs; and successively coupling an additional ring of hopper panels to the bottom of the previously coupled hopper panels;

wherein the supporting the assembled commercial hopper grain bin shell above the concrete pad with the jacks while coupling the horizontal support beam ring includes coupling the jacks to the assembled commercial hopper grain bin shell;

wherein the successively supporting the assembled commercial hopper grain bin shell and the vertical support legs previously coupled to the horizontal support beam ring above the concrete pad with the jacks includes coupling the jacks to the vertical support legs previously coupled to the horizontal support beam ring; and wherein the commercial hopper grain bin assembly method assembles a commercial hopper grain bin including the horizontal support beam ring, the uppermost ring of vertical support legs, the additional ring of vertical support legs, the uppermost ring of hopper panels, and the additional ring of hopper panels.

2. The commercial hopper grain bin assembly method of claim 1, wherein each of: the coupling the horizontal support beam ring around the bottom of the assembled commercial hopper grain bin shell, the coupling the uppermost ring of hopper panels to the horizontal support beam ring, the successively coupling the additional ring of vertical support legs to the bottom of the previously coupled vertical support legs, and the successively coupling the additional ring of hopper panels to the bottom of the previously coupled hopper panels, is accomplished at a height above the concrete pad which can be reached without the need for scaffolding.

3. The commercial hopper grain bin assembly method of claim 2, wherein the coupling the uppermost ring of vertical support legs to the horizontal support beam ring is additionally accomplished at a height above the concrete pad which can be reached without the need for scaffolding.

4. The commercial hopper grain bin assembly method of claim 1, wherein each of the coupling the horizontal support beam ring around the bottom of the assembled commercial hopper grain bin shell, the coupling the uppermost ring of hopper panels to the horizontal support beam ring, the successively coupling the additional ring of vertical support legs to the bottom of the previously coupled vertical support legs, and the successively coupling the additional ring of hopper panels to the bottom of the previously coupled hopper panels, is accomplished at a height of less than 8 feet above the concrete pad.

5. The commercial hopper grain bin assembly method of claim 4, wherein the coupling the uppermost ring of vertical support legs to the horizontal support beam ring is additionally accomplished at a height of less than 8 feet above the concrete pad.

6. The commercial hopper grain bin assembly method of claim 5, wherein the coupling the horizontal support beam ring around the bottom of the assembled commercial hopper grain bin shell is accomplished while the horizontal support beam ring is positioned at a height of less than 4 feet above the concrete pad.

7. The commercial hopper grain bin assembly method of claim 1, further comprising supporting the assembled commercial hopper grain bin shell and the previously coupled horizontal support beam ring above the concrete pad with the jacks while coupling the uppermost ring of vertical support legs to the horizontal support beam ring.

8. The commercial hopper grain bin assembly method of claim 1, further comprising supporting the assembled commercial hopper grain bin shell and the previously coupled horizontal support beam ring above the concrete pad with the jacks while coupling the uppermost ring of hopper panels to the horizontal support beam ring.

9. The commercial hopper grain bin assembly method of claim 1, further comprising successively supporting the assembled commercial hopper grain bin shell and the hopper panels previously coupled to the horizontal support beam ring above the concrete pad with jacks while successively coupling the additional ring of hopper panels to the bottom of the previously coupled hopper panels.

10. The commercial hopper grain bin assembly method of claim 9, further comprising supporting the assembled commercial hopper grain bin shell and the previously coupled horizontal support beam ring above the concrete pad with the jacks while coupling the uppermost ring of hopper panels to the horizontal support beam ring.

11. The commercial hopper grain bin assembly method of claim 10, wherein the jacks are coupled to vertical stiffeners of the commercial hopper grain bin shell while coupling the uppermost ring of hopper panels to the horizontal support beam ring.

12. The commercial hopper grain bin assembly method of claim 10, further comprising supporting the assembled commercial hopper grain bin shell and the previously coupled horizontal support beam ring above the concrete pad with the jacks while coupling the uppermost ring of vertical support legs to the horizontal support beam ring.

13. The commercial hopper grain bin assembly method of claim 12, wherein the jacks are coupled to vertical stiffeners of the commercial hopper grain bin shell while coupling the uppermost ring of vertical support legs to the horizontal support beam ring.

14. The commercial hopper grain bin assembly method of claim 1, wherein the coupling the horizontal support beam ring around the bottom of the assembled commercial hopper grain bin shell includes coupling a set of stub legs integrated with the horizontal support beam ring around the bottom of the assembled commercial hopper grain bin shell.

15. The commercial hopper grain bin assembly method of claim 1, wherein the jacks are positioned exteriorly while successively coupling the additional ring of hopper panels to the bottom of the previously coupled hopper panels.

16. The commercial hopper grain bin assembly method of claim 15, wherein the jacks are positioned interiorly while successively coupling the subsequent corrugated side-wall panel ring to the bottom of the plurality of previously coupled side-wall panel rings.

17. The commercial hopper grain bin assembly method of claim 16, wherein the jacks are coupled to at least one horizontal seam between the plurality of the previously coupled side-wall panel rings while successively coupling the subsequent corrugated side-wall panel ring to the bottom of the plurality of previously coupled side-wall panel rings.

18. The commercial hopper grain bin assembly method of claim 1, wherein the jacks are coupled to the previously coupled vertical support legs while successively coupling the additional rings of vertical support legs to the bottom of the previously coupled vertical support legs.

19. The commercial hopper grain bin assembly method of claim 1, wherein the jacks are positioned exteriorly while successively coupling the coupling the additional rings of vertical support legs to the bottom of the previously coupled vertical support legs.

20. The commercial hopper grain bin assembly method of claim 1, wherein the bottom of the previously coupled vertical support legs and the bottom of the previously coupled hopper panels are coordinated to simultaneously position both at a height above the concrete pad which can be reached without the need for scaffolding to enable both the coupling the additional ring of vertical support legs and the coupling the additional ring of hopper panels without the need to adjust a bin height above the concrete pad.

21. The commercial hopper grain bin assembly method of claim 1, further comprising coupling cross-bracing between adjacent vertical support legs of each ring of vertical support legs.

22. The commercial hopper grain bin assembly method of claim 21, wherein the hopper panels are moved to a bin interior through space between at least one pair of adjacent vertical support legs of the uppermost ring of vertical support legs prior to coupling the cross-bracing between the at least one pair of adjacent vertical support legs.

23. The commercial hopper grain bin assembly method of claim 1, wherein the successively coupling the additional rings of vertical support legs to the bottom of the previously coupled vertical support legs comprises coupling a first ring of vertical support legs in which the vertical support legs have a first configuration and coupling a second ring of vertical support legs in which the vertical support legs have a second configuration that is different from the first configuration.

24. The commercial hopper grain bin assembly method of claim 23, wherein the second configuration comprises the vertical support legs with the first configuration having a different length than the vertical support legs with the second configuration.

25. The commercial hopper grain bin assembly method of claim 1, further comprises using vertical support legs having a first configuration to assemble both a first commercial hopper grain bin having a first diameter and a second commercial hopper grain bin having a second diameter.

26. The commercial hopper grain bin assembly method of claim 1, wherein the assembling a commercial hopper grain bin shell comprises assembling a commercial hopper grain bin shell having a diameter of 36 feet or greater.

27. The commercial hopper grain bin assembly method of claim 1, wherein the assembling a commercial hopper grain bin shell comprises assembling a commercial hopper grain bin shell having a diameter of 42 feet or greater.

28. The commercial hopper grain bin assembly method of claim 1, wherein the assembling a commercial hopper grain bin shell comprises assembling a commercial hopper grain bin shell having a diameter of 48 feet or greater.

29. The commercial hopper grain bin assembly method of claim 1, wherein each of the successively supporting the assembled commercial hopper grain bin shell and the vertical support legs previously coupled to the horizontal support beam ring above the concrete pad with the jacks includes coupling the jacks to the vertical support legs previously coupled to the horizontal support beam ring.

30. A commercial hopper grain bin assembly method comprising:
    assembling a commercial hopper grain bin shell on a concrete pad by successively supporting a plurality of corrugated side-wall panel rings that have been previously coupled together above the concrete pad with jacks while coupling a subsequent corrugated side-wall panel ring to a bottom of the plurality of previously coupled side-wall panel rings;
    supporting the assembled commercial hopper grain bin shell above the concrete pad with the jacks while coupling a horizontal support beam ring around a bottom periphery of the assembled commercial hopper grain bin shell;
    supporting the assembled commercial hopper grain bin shell and the previously coupled horizontal support beam ring above the concrete pad with the jacks while coupling an uppermost ring of vertical support legs to the horizontal support beam ring;
    supporting the assembled commercial hopper grain bin shell and the previously coupled horizontal support beam ring above the concrete pad with the jacks while coupling an uppermost ring of hopper panels to the horizontal support beam ring;
    successively supporting the assembled commercial hopper grain bin shell and the vertical support legs previously coupled to the horizontal support beam ring above the concrete pad with the jacks while coupling an additional ring of vertical support legs to the bottom of the previously coupled vertical support legs; and
    successively supporting the assembled commercial hopper grain bin shell and the hopper panels previously coupled to the horizontal support beam ring above the concrete pad with the jacks while coupling an additional ring of hopper panels to the bottom of the previously coupled hopper panels;
    wherein the supporting the assembled commercial hopper grain bin shell above the concrete pad with the jacks while coupling the horizontal support beam ring includes coupling the jacks to the assembled commercial hopper grain bin shell;
    wherein the successively supporting the assembled commercial hopper grain bin shell and the vertical support legs previously coupled to the horizontal support beam ring above the concrete pad with the jacks includes coupling the jacks to the vertical support legs previously coupled to the horizontal support beam ring; and
    wherein the commercial hopper grain bin assembly method assembles a commercial hopper grain bin including the horizontal support beam ring, the uppermost ring of vertical support leas, the additional ring of vertical support legs, the uppermost ring of hopper panels, and the additional ring of hopper panels.

31. The commercial hopper grain bin assembly method of claim 30, wherein each of the successively supporting the assembled commercial hopper grain bin shell and the vertical support legs previously coupled to the horizontal support beam ring above the concrete pad with the jacks includes coupling the jacks to the vertical support legs previously coupled to the horizontal support beam ring.

* * * * *

UNITED STATES PATENT AND TRADEMARK OFFICE
CERTIFICATE OF CORRECTION

| | |
|---|---|
| PATENT NO. | : 11,248,388 B2 |
| APPLICATION NO. | : 16/866069 |
| DATED | : February 15, 2022 |
| INVENTOR(S) | : Mark S. Dingeldein et al. |

It is certified that error appears in the above-identified patent and that said Letters Patent is hereby corrected as shown below:

In the Claims

Column 11, Line 23:
In Claim 19, "coupling the coupling the" should be --coupling the--

Column 12, Line 67:
In Claim 30, "leas," should be --legs,--

Signed and Sealed this
Twenty-fourth Day of May, 2022

*Katherine Kelly Vidal*

Katherine Kelly Vidal
*Director of the United States Patent and Trademark Office*